(12) United States Patent
Halstead et al.

(10) Patent No.: US 6,230,318 B1
(45) Date of Patent: May 8, 2001

(54) APPLICATION PROGRAMS CONSTRUCTED ENTIRELY FROM AUTONOMOUS COMPONENT OBJECTS

(75) Inventors: Mark A. B. Halstead, Kirkland; Charles T. Loop, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/028,562

(22) Filed: Feb. 24, 1998

(51) Int. Cl.[7] ........................................................ G06F 9/45
(52) U.S. Cl. ..................................... 717/10; 717/1; 717/11
(58) Field of Search .................................. 395/705, 710, 395/712; 717/1, 10, 11, 201, 203

(56) References Cited

U.S. PATENT DOCUMENTS

| | | | |
|---|---|---|---|
| 5,170,465 | * 12/1992 | McKeeman et al. | 717/7 |
| 5,339,435 | * 8/1994 | Lubkin et al. | 717/11 |
| 5,361,360 | * 11/1994 | Ishigami et al. | 717/11 |
| 5,428,792 | * 6/1995 | Conner et al. | 717/8 |
| 5,544,302 | * 8/1996 | Nguyen | 345/326 |
| 5,613,122 | * 3/1997 | Burnard et al. | 713/1 |
| 5,659,735 | * 8/1997 | Parrish et al. | 707/10 |
| 5,701,472 | * 12/1997 | Koerber et al. | 707/203 |
| 5,760,773 | * 6/1998 | Berman et al. | 345/347 |
| 5,764,989 | * 6/1998 | Gustafssan et al. | 395/704 |
| 5,872,974 | * 2/1999 | Mezick | 717/1 |
| 5,890,176 | * 3/1999 | Kish et al. | 707/511 |
| 5,896,532 | * 1/2000 | Blewett | 709/310 |
| 5,974,253 | * 10/1999 | Nahaboo et al. | 717/1 |
| 6,018,628 | * 1/2000 | Stoutamire | 717/5 |
| 6,093,215 | * 7/2000 | Buxton et al. | 717/1 |

OTHER PUBLICATIONS

Li et al, "Using SDL to model an object oriented real time software architectural design", IEEE, pp. 288–295, 2000.*

Lee te al, "object orienetd manufacturing application framework", IEEE, pp. 253–262, 2000.*

Nada et al, "Software resue technology practice and assessment tool kit", IEEE, pp. 307–316, 2000.*

Hadjami et al, "A reuse approach based on object orientation its contribution in the development of CASE tools", SSR ACM pp. 53–62, Jan. 1995.*

Sugiyama, "Object make a tool for constructing software systems from existing software components", SSR ACM pp. 128–136, Jan. 1995.*

Basili et al, "Characterzing and modling the cost of rework in a library of resuable software components", ICSE ACM, pp. 282–291, Sep. 1997.*

Ghezala, "A reuse approach based on object orienation its conributes in the development of CASE tools", ACM SSR, pp. 53–62, Jan. 1995.*

Fischer, "Specification based browsing of software component libraries", DFG Grant Sn 11/2-3, pp. 1–10, 1998.*

Boher et al, "Distributed object applications", comm. of the ACM, col 41, No. 6 pp. 43–48, 1998.*

Weeks, "The sweet smell of C+ +", Windows Tech Journal, pp. 69–72, Sep. 1994.*

* cited by examiner

Primary Examiner—Mark R. Powell
Assistant Examiner—Anil Khatri
(74) Attorney, Agent, or Firm—Schwegman, Lundberg, Woessner & Kluth, P.A.

(57) ABSTRACT

An application program is constructed entirely from a collection of individual reusable tools arranged in a tree structure. Each tool provides resources for other tools in the tree, located by a hierarchical search. A configuration file read into the root tool of the structure as a resource provides a persistent specification of the placement of other tools in the tree, user interface elements, and other state information. The interfaces used by the tools can also be stored as resources in the tools themselves. Each tool is a class in an object-oriented language having inheritance. A base class, subclassed by all tools, provides a number of widely useful functions.

25 Claims, 4 Drawing Sheets

APPLICATION PROGRAMS CONSTRUCTED ENTIRELY FROM AUTONOMOUS COMPONENT OBJECTS

BACKGROUND OF THE INVENTION

The present invention relates to electronic data processing, and more specifically concerns the construction of entire application programs solely from small reusable components that can be substituted and reconfigured easily and quickly.

Major application programs, such as word processors, spreadsheets, and computer-aided design programs, are conventionally written as complete, standalone packages. Although the code may actually consist of many smaller modules, each module is purpose-built for the particular application, and the modules are interconnected with each other according to specifications that vary with each project.

Conventional software design methods make it difficult to add new functions to application programs, to upgrade existing functions, and even to fix bugs. Highly trained programmers familiar with the design details of the application must tease out the code to be modified or replaced, and must take great care not to modify other functions inadvertently or to break any of the existing interconnections.

Recent advances in design methodology have alleviated these problems to some degree. Packaging functions used by many programs into dynamic link libraries (.dll) provides a degree of commonality for low-level functions shared among applications in a suite. However, these are purpose-built for specific sets of applications, and are rarely useful for other applications or even for other versions of the same application without at least some modification by expert programmers.

The current trend in application development involves the use of object-oriented or component-based technologies. In the ideal use of this approach, an application is a collection of components, each performing a different task. These components work together to provide the overall functionality of the application. Programmers might write the individual components specifically for the application, or may take them from a library of components provided by a third party. The functionality provided by a component ranges from a simple button in a user interface to an entire spreadsheet. Components can be built in available technologies such as Component Object Model, OpenDoc, and Java Beans.

A programmer constructs an application in these technologies by using a development tool such as Microsoft Visual Basic to choose components and wire up connections among them. The programmer must employ a great deal of skill in understanding the meanings of the different methods of each component and in selecting which methods of each component may call which other components. The resulting application is a network highly dependent upon the particular components chosen, and has an arbitrary and usually complex topology. There is no explicit definition of this topology; one can know how the components work together only by examining the details of the network itself.

Object-oriented languages such as C++ and Java allow the construction of program components and even entire applications by building up hierarchies of classes that incorporate or inherit functions (methods) from more primitive classes at lower levels. Such hierarchies, however, are by nature static and unchangeable. For example, adding one class into a superclass can only be done by a programmer at the source-code level. Removal of a class from its superclass causes unpredictable failures, because there is no way to know in advance which other classes might also use the methods of the removed class.

An emerging trend in application development involves the concept of plug-ins. For example, third-party providers develop programs that plug into internet browsers for performing certain kinds of multimedia files automatically whenever the browser encounters those file types. Plug-ins are relatively easily replaceable and upgradable separately from the main application. However, they provide only a very small portion of the overall function of any application, and they must still be built specially for each application.

Even with the many techniques currently available to the art, the design, coding, maintenance, and enhancement of major application programs involve long, expensive efforts. A change in one part of the program frequently propagates to other parts, requiring further changes, as well as further opportunities for errors. Applications cannot be subsetted for situations where only part of the application's total functionality is needed. Enhancing an application requires replacing substantially all of the original code in an upgrade package. Any of these tasks requires skilled programmers having experience in the software technologies and large amounts of time and effort. Certainly the concepts of allowing users to design or redesign an application to their own tastes, to replace or upgrade parts of an application with third-party components, or to install small fixes in large programs, remain a pipe dream.

SUMMARY OF THE INVENTION

The present invention provides an architecture for constructing application programs entirely from small components. The architecture allows the components to be assembled and reassembled in different configurations, greatly facilitating the addition, removal, and substitution of different components. The components can be reassembled every time the user invokes the application, so that installation of upgrades, fixes, and additional features requires only a short time and minimum effort. Upgrades and fixes can be sent online, even for very large applications, because only a few components need be transmitted. Third-party suppliers can provide inexpensive upgrades to individual functions of an application, and can market extended or specialized features without having to recreate all the basic functions of the application.

The invention constructs an application program entirely from plug-together components or tools arranged in a tree hierarchy specified by a configuration file that can be easily modified to change the configuration arbitrarily. The resources that each component requires, and that it provides to other components, are made explicit. All necessary user-interface constructs and layouts are described explicitly.

Another major advantage of the invention is to reduce the load on the tool writer so that effort can be concentrated on implementing tool functionality, rather than managing windows, buttons, and menu bars. In many cases, writing a tool is simply a matter of implementing the code that will be executed when the tool is invoked. The most common way for a user to invoke a tool is through the interface, by selecting a menu item or pressing a button. The invention manages the interface and calls the appropriate method of the appropriate tool as the user interacts with the application.

The tools work together to provide all of the application's functionality. The entire application becomes a tree of tools. At the root of the tree is a single base tool that is the parent of all other tools in the tree. The tree structure is stored in text format in a configuration file loaded every time a user invokes the application, so that the application can be modified every time it is started. This file also defines the appearance of the application's user interface, such as the layout of the menus and the buttons. A property store in each tool provides resources to itself and to other tools higher in the tree. A tool finds a resource whenever it is needed by hierarchically searching the property stores, starting with its own store.

Other aspects of the invention within the scope and spirit of the appended claims will become apparent to those skilled in the art from the following detailed description.

DETAILED DESCRIPTION

Illustrative Operating Environment

Figure 1:
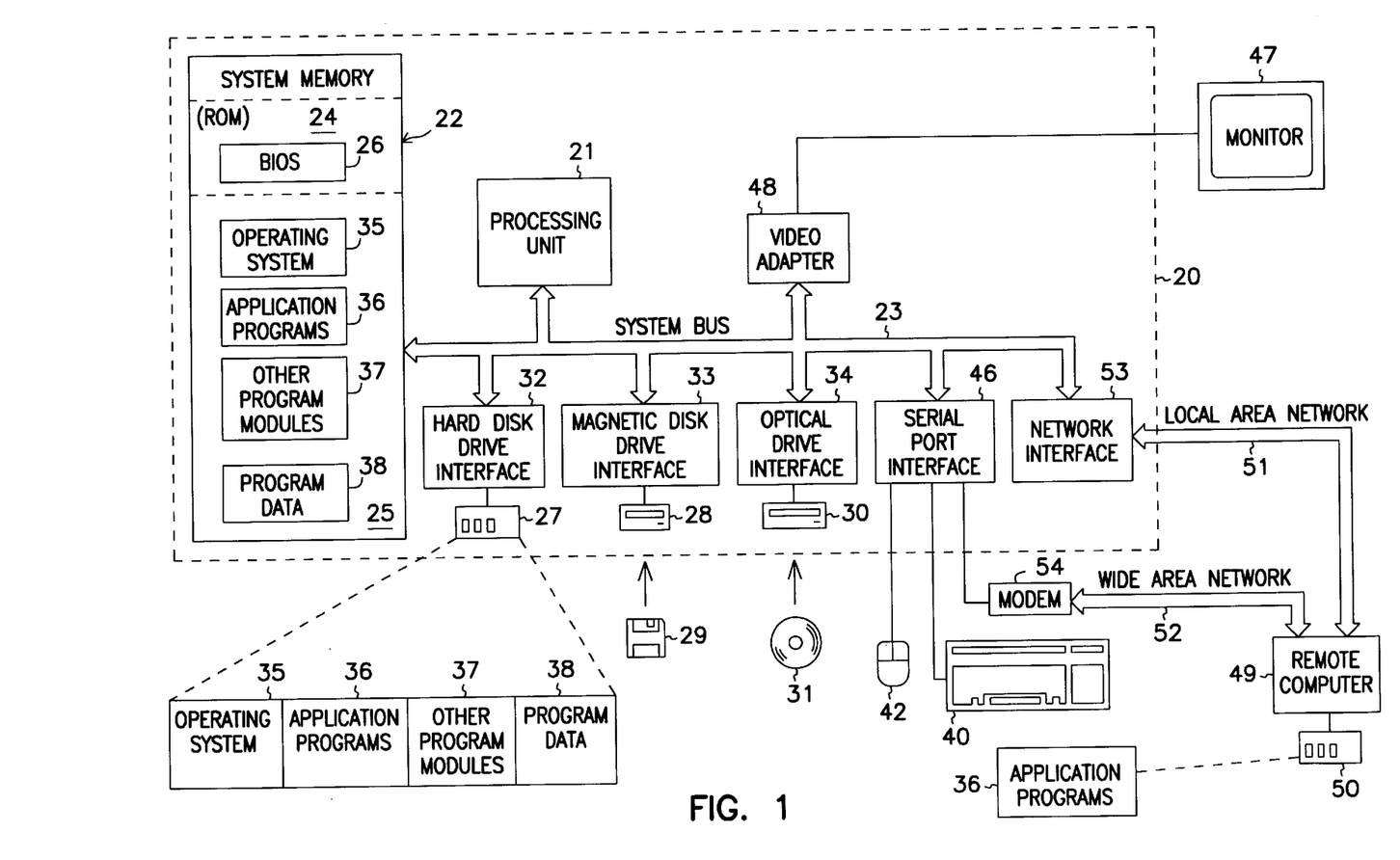
FIG. 1 illustrates a typical operating environment for the present invention.

FIG. 1 provides a brief, general description of a suitable computing environment in which the invention may be implemented. The invention will hereinafter be described in the general context of computer-executable instructions such as program modules, executed by a personal computer (PC); however, other environments are possible. Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PC's, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows an exemplary system for implementing the invention. It employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Tool Trees

Th following describes particular tool-tree structures for application programs and methods for constructing and using such structures. The described embodiment is not, however, to be taken in a limiting sense; other means and methods are available to the art for practicing the invention set forth in the claims. In particular, the present embodiment employs tool structures known in the art as "trees" for constructing application programs. Other embodiments, however, could use a broader range of structures known as acyclic directed graphs; trees are a proper subset of this structural form. Thus, the term "tree" herein is intended to include other kinds of directed acyclic graphs as well.

Figure 2:
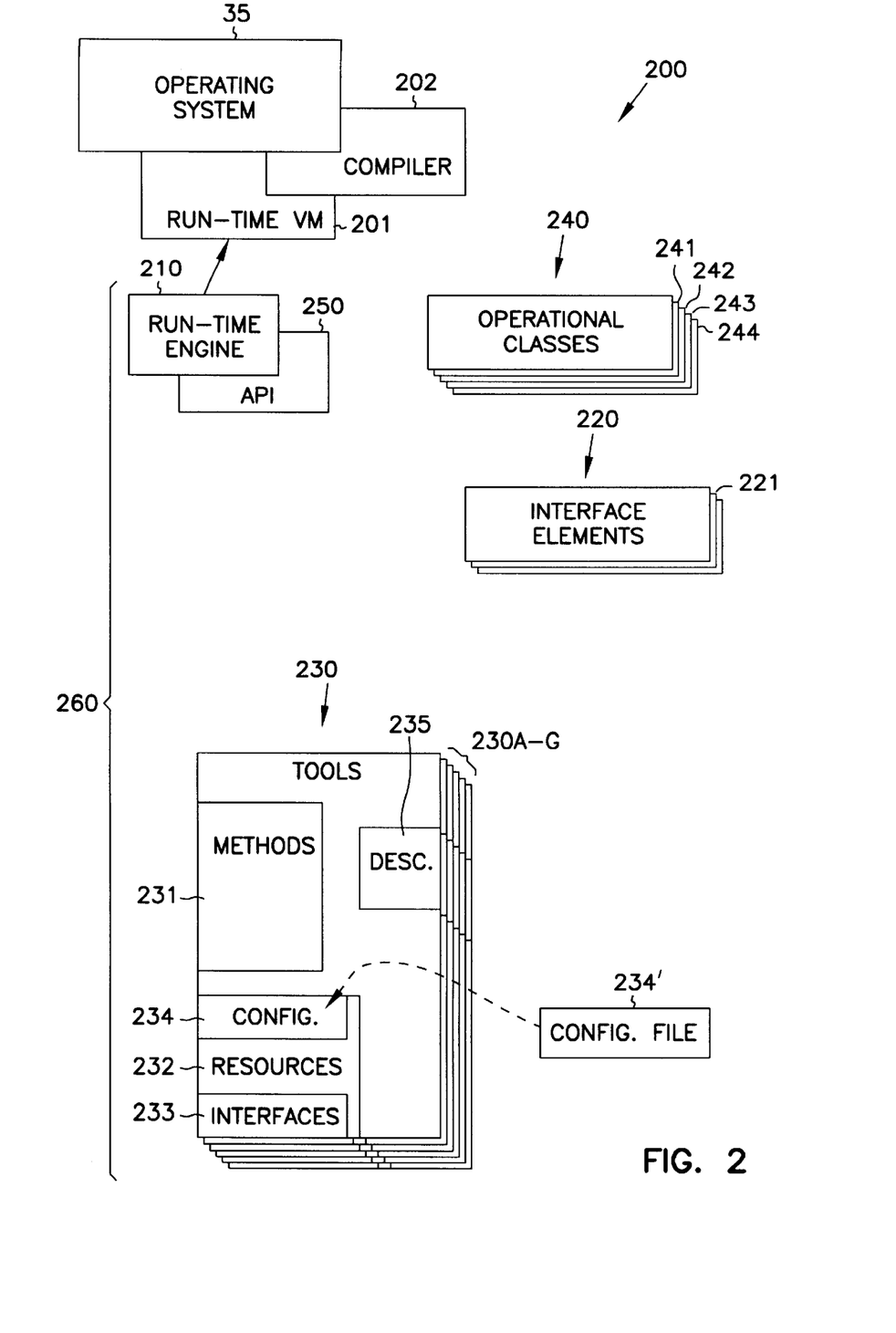
FIG. 2 is a block diagram of a set of component tools for constructing application programs according to the invention.

FIG. 2 is a block diagram of a collection 200 of tools and other components involved in an application program using the framework of the present invention. Conventional operating system 35, duplicated from FIG. 1, hosts the execution of all application programs, including the tool-based application programs of the invention. It schedules the execution of programs, and provides services in the form of application-program interfaces (APIs) which any application program can invoke. In the particular form to be described, the components of tool-based programs are written in the publicly available Java language. This language employs a virtual machine 201 (VM) running under OS 35 to execute applications interpretively after a Java compiler 202 has translated the source program to a tokenized form. Other embodiments may employ other conventional execution platforms, such as directly executed compiled C++ code.

The Steam system has its own run-time engine 210 which builds tool-based applications, and can even add and remove individual tools while an application is running. Engine 210 contains conventional capabilities for building and managing user interface elements such as menu bars and toolbars automatically, freeing the developer from the burden of this conceptually simple but in practice detailed and error-prone task. The system also provides implementations of common interface layouts 220 in the publicly available AWT (Abstract Window Toolkit), or any similar conventional toolkit. A dnx.steam.ToolInterface class 221, for example, defines user interface elements and all the AWT classes that implement them. A ToolInterface element is a user interface element such as a menu bar, menu item, palette of buttons, or a button. A base tool class contains methods for constructing hierarchies of ToolInterfaces from definitions contained in a configuration file, as described below. Designers who wish to implement their own interface elements, however, can code their own implementations of ToolInterface The overall system also includes a number of individual components or tools collectively labeled 230, described in greater detail below. Each of these tools is a Java class. A number of operational Java classes 240 provide methods for running tools and other aspects of the system, although they are not themselves used as tools. That is, all tools are implemented as Java classes, although not all of the Java classes used in the invention are tools. It is important to note that the classes 230 and 240 may subclass each other in a normal manner so as to provide methods, data, and other facilities to each other. This conventional static subclass hierarchy is entirely separate from the dynamic tool-tree hierarchy to be described below; the two hierarchies exist simultaneously, yet independently of each other. Unless otherwise noted, the terms "hierarchy" and "tree" will refer to the dynamic tool-tree structure of the invention, rather than to the conventional static subclass structure of the classes 230 and 240.

The dnx.steam.Tool class 241 is the base class that must be subclassed by all other tools in an application. Its methods implement basic functions required for all applications, and provide default behaviors for other tools. For example, the following methods are implemented within base class 241. They perform functions which handle common tasks in a manner appropriate for most tools.

public void show ( ) shows all tool visuals owned by the tool (e.g., ToolFrame visible representations) after they have been hidden. A tool is usually hidden if its parent is no longer the current tool. The default implementation provided by Tool may call show ( ) on all ToolFrames.

public void hide ( ) hides any visible representation of a tool (e.g. ToolFrames) after it has been invoked. The default implementation may call hide ( ) on all ToolFrames.

public void close ( ) closes a tool, usually when a user presses the "close" button on a ToolFrame, or when the tool's parent is closed. The default implementation may call close ( ) on all ToolFrames.

public void dispose ( ) closes the tool when it is being removed from the application. It indicates that any resources used by the tool can be disposed of. public void start( ) restarts a tool after it has been stopped.

public void stop ( ) stops a tool.

public void deactivate ( ) deactivates a tool that calls it. Sometimes a tool loses resources it requires, such as mouse input from a window; it then deactivates itself until it regains those resources.

public void activate ( ) is usually called by a tool itself to indicate that it is active. This call sends out a ToolEvent that indicates to any ToolInterfaces associated with the tool that they should activate themselves; e.g buttons will depress themselves. A tool also calls this method after deactivation, when it has regained a required resource.

public void disable ( ) may be called when a tool determines that it does not have enough information to perform its function. For example, the Paste tool can disable itself (and cause its menu entry to be dimmed) if there are no entries currently in the copy buffer available to be pasted.

public void enable ( ) is similar to activate ( ), but causes any ToolInterfaces to become enabled if they were disabled by a prior disable ( ) call.

All tools 230 used in tool-based applications must subclass base class 241; therefore, all tools in any application inherits its methods. This allows engine 210 to control tools and their interactions in a uniform manner. Moreover, the individual tools 230A–230G in FIG. 2 need only implement methods for executing their own additional functionality, using the base-class methods for everything else. Any tool can, however, override any of the default methods provided by base class 241 whenever those methods are deemed inappropriate for a particular tool.

The dnx.steam.PropertyStore class 242 implements hierarchical structures of the resources provided and consumed in the various tools in an application. It supports wildcard queries and an observation mechanism that issues events to observers when properties are added or removed. The dnx.steam.ToolFrame and dnx.steam.ToolFrameContent classes 243 implement a frame owned by a tool and its content, for example, a panel and a menu bar. A frame can be shared between different tools, and it maintains a stack of contents. The default behavior of the owning tool manages a ToolFrame, showing and hiding it at appropriate times.

The system also includes the dnx.steam.SelectionContainer class and associated classes 244. A selection container is a user interface item, such as text or a scene, that has an associated list of currently selected items. The standard cut and paste tools provided by the package operate on the selection container that currently has focus. A selection container can also provide drag and drop support. Frames and containers are instances of a more abstract concept called a tool visual, which is a visual representation of a tool; other types of tool visuals can also be used in this context. The dnx.steam.Attachable class 244 provides an object to which tools can attach. It can be used in a conventional manner to control access to various resources, such as mouse input from a particular window, or to maintain lists of most recently used tools. An attachable object maintains a stack of attachers, and issues callbacks to notify attachers of their status.

System 200 also includes an API 250 that provides a set of abstractions related to tools and their visual representation. By programming to this API, a developer can package functionality in a standardized format that run-time engine 210 can load into any application.

A system development kit (SDK) 260 might also include implementations of tools 230 for providing commonly used functionality such as generic cut, paste, and undo/redo. These can be included in any application without recompilation, allowing the developer to snap them together with other more specific tools with minimal effort, and without having to redo functions that are widely used. Further utility classes, not shown, can also be provided in a developers' kit.

Individual tools 230A–230G provide different functions of an application program. Briefly, a tool 230 incorporates one or more methods 231 in the same way as does any conventional Java class. A tool also includes a set of resources 232. A tool can use its own resources, and it can provide them to other tools. Conversely, the methods 231 of a tool 230 can consume resources provided by other tools. Resources are also referred to as properties, and the set of resources is referred to as a property store. Some resources define interfaces 233, such as menus and buttons, and specify their layout. At least one tool 230A in each application base tool further contain a resource called a configuration file 234, whose purpose is to define tool interconnections according to the invention. File 234 is stored separately, as indicated by block 234' and the dashed line, in order to provide a persistent representation of the tree structure over many invocations of the application; the file is read into base tool 230A each time the application starts. Finally, tool description 235 includes the names of the resources that the tool publishes to other tools and the names of resources that it requires to operate correctly. Description 235 can alternatively constitute a part of configuration file 234.

Certain required methods must be implemented in every tool. Every tool must be invoked; therefore, it must implement a method by which the tool is called by a user interface such as a button or menu entry. Any tool which opens ToolFrames is also invoked whenever the user clicks inside one of these frames. Of course, a method for closing the tool is also required; but the close ( ) method of the base tool is most likely sufficient. For tools that perform instantaneous actions such as cut and paste, invoke ( ) might be the only required method that needs to be written separately for each tool. Simple tools that receive no further user input and open no frames have no persistent state or visual representation that needs to be removed when the tool or a parent is closed or hidden. An example of a very simple tool is one which merely prints a message; its invoke ( ) method performs the entire function of the tool.

```
public class SimpleTool extends Tool
    public void invoke( )
    {
        System.out.println("You have a message");
    }
}
```

Creating an interface that will invoke this tool (a menu entry or a button with an appropriate label) is the job of a parent tool. All elements in the user interface must be owned by a tool. For example, a document is usually displayed in a frame as a visual manifestation of a document tool that owns the document. The frame itself might be owned by the base tool as a parent of the document tool. By defining resources that specify where and how the interface should appear, a parent tool builds the interface automatically. For example, to create a menu entry labeled "Message" for the SimpleTool in a menu named "Other" in another tool, ParentTool, that tool must define the resources:

```
ToolDef/dnx.example.ParentTool/Tools/MenuBar/Other/
dnx.example.SimpleTool with the value VoidProperty
    ToolDef/dnx.example.SimpleTool/Interface/Label with the value
"Message"
```

This example illustrates the form of resources 232 in general. Each resource or property is a string serving as a name, together with a value of the resource. Resources are structured, so the name usually is compound. That is, the interface resource named Label is an Interface from dnx.example.SimpleTool, inherited from ToolDef. Its value, "Message", is what is displayed on the menu bar in the first resource listed above.

Configuration file 234 is a resource that specifies how tools are to be interconnected with each other. It is a text file that lists the names of all tools in an application and the parent-child relationships among them. The configuration file also specifies the layout of the user-interface elements such as tool interfaces and displayed visuals. Finally, this file contains persistent state data for any tool which needs it. For example, the following configuration-file fragment defines a "Color" tool for changing the color of an object in an image-editor application.

```
(ToolDef
    (dnx.1reditor.tools.ColorTool
        (ToolName "Set Color Tool")
        (Interface
            (Label Color)
            (Tip "Set Color")
            (ImageSource "./icons/color_ico.gif")
        )
    )
)
```

This example shows the hierarchical structure of the properties defined by configuration file 234. After this file has been loaded into tool 230A, the Label property for the "Color" tool is accessed with the name ToolDef|dnx.lreditor.tools.ColorTool|Interface|Label, whose return value is a StringProperty with the value "Color". This is the label that appears in a menu entry for this tool. If a button is created, the image specified by ImageSource is displayed. The Tip is a string displayed when the user holds the mouse over the button for a while, conventionally known as a tool-tip. The structure of the configuration information has been chosen so that it can be queried using wildcards. For example, to retrieve the class names of all tools, we may issue the call getProperty("ToolDef|."). This query returns a property store containing the requested properties.

Formally, a configuration file is a text file that contains zero or more properties, along with optional comment lines that begin with the symbol "#". Properties in the file can be read and placed into a property store. Property values can be either character strings, StringProperty, or floating-point numbers, DoubleProperty; properties of any other type can be supported if desired. A property has one of the following formats:

(name) generates a single property with the given name, and a value of VoidProperty.

(name value) generates a single property with the given name and a value of the corresponding type, StringProperty or DoubleProperty.

(name value1 value2 . . . ) generates a single property with the given name and a value of PropertyList, that is, a list of elements having type StringProperty or DoubleProperty.

```
(name
    property1
    property2
    . . .
)
``` generates a single property with the given name and a value that is a property store containing the listed subproperties. This format is used for creating hierarchical property stores.

The configuration file 234 defines the hierarchy of all the other tools in the tool tree of an application. In order for a tool to be included in an application's tool tree, it must be added as a subtool or child of some other, parent, tool, such that the path of parents leads to the dnx.steam.SteamEngine tool. A tool specifies its subtools by defining a Tools subproperty in the configuration file. This structured property defines not only the tree of subtools, but also the layout of the subtool's interfaces within the parent tool. For example, the following is a part of the definition of a GroupEditor tool designed to edit a three-dimensional view of a scene rooted at a GroupNode.

```
(ToolDef
    (dnx.1reditor.GroupEditor
        (Tools
            (MenuBar
                (File
                    (New
                        (Grouping
                            (dnx.1reditor.tools.GroupNodeTool)
                        )
                    )
                    (dnx.1reditor.tools.OpenTool)
                    (dnx.1reditor.tools.SaveTool)
                    (--separator--)
                    (dnx.1reditor.tools.QuitTool)
                )
                (Edit
                    (dnx.1reditor.tools.UndoTool)
                    (dnx.1reditor.tools.RedoTool)
                    (dnx.steam.tools.CutTool)
                    (dnx.steam.tools.CopyTool)
                    (dnx.steam.tools.PasteTool)
```

-continued

```
                )
                (Other
                    (dnx.1reditor.tools.ColorTool)
                )
            (Button
                (Viewers
                    (dnx.1reditor.tools.SimpleViewerTool)
                    (dnx.1reditor.tools.PanViewerTool)
                    (dnx.1reditor.tools.TiltViewerTool)
                )
                (Appearance
                    (dnx.1reditor.tools.ColorTool)
                    (dnx.1reditor.tools.TextureTool)
                )
            )
        )
    )
)
```

Listed beneath the Tools property are hierarchical ToolInterface structures, with tool class names at the leaves. The configuration file contains the entire layout of the interfaces; thus the only action required is to add an entry for a new tool in the appropriate places. In the above example, the "Color" tool appears both as a button tool and as a menu bar tool, allowing it to be invoked from either place. The special entry (--separator--) indicates the insertion of a menu separator. This device also inserts separators into other ToolInterface items that support them. A configuration file may be thought of as specifying a set of resources used when the application is executed. The base tool in an application incorporates the configuration file in its property store.

Rather than having a single configuration file for an application, the file could be split among the tools making up the application. This facility is already employed in a rudimentary way. For example, a tool can dynamically modify its label, the text that appears in its menu entry. The "Undo" tool changes its own label to reflect the operation that is to be undone, e.g., "Undo Color Change". These tools store their dynamic labels in their own property stores, rather than in the property store of the base tool. Moreover, subtool placement information need not always be stored in a configuration file. A tool can add this data to a property store—including its own property store—at runtime. Another extension concerns a tool definition fragment file. When a new tool or set of tools is downloaded and added to a tool-tree application, definitions for these tools must be inserted into the configuration file. Fragment files are merely text files that contain these definitions and a list of the resources required by the tools. When a user requests that the new tools be added to the application, the fragment-file contents are written into configuration file 234.

Figure 3:
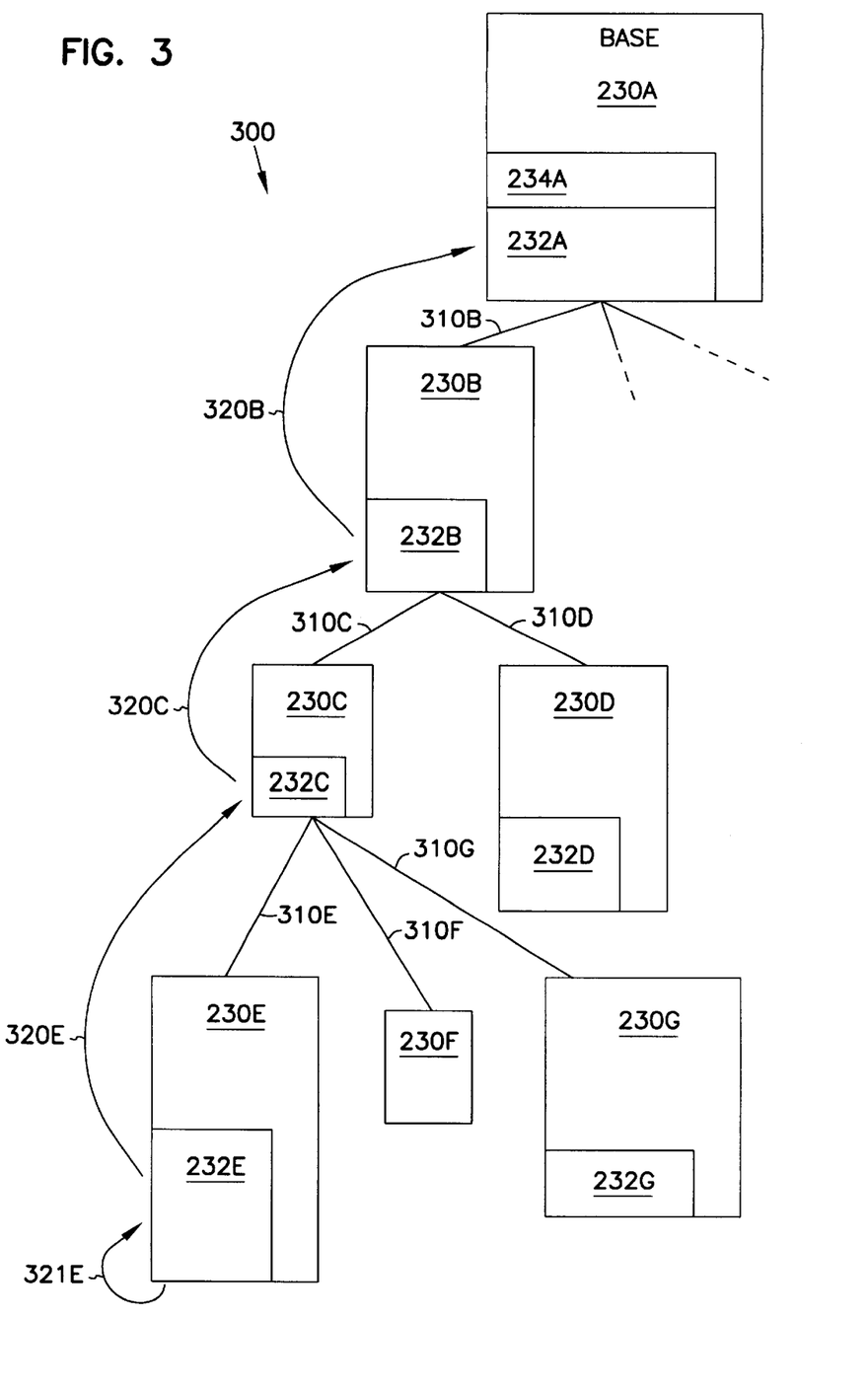
FIG. 3 is a block diagram of an application program using the component tools of FIG. 2.

FIG. 3 is a conceptual diagram of a tree of tools configured to form an application program 300 constructed according to the invention. As mentioned previously, an instance of root tool 230A is the root of the tree of every application, and all other tools in the application are children of that tool. In this example, the configuration file 234 specifies that tool 230B is a child of root tool 230A, 230C and 230D are children of 230B, and 230E–230G are children of 230C.

Lines 310B–310G indicate the placement of the tools 230A–230G in tree 300. The present environment differs from the normal situation where a great deal of method commonality among classes is desired. Here, the best practice is to minimize dependencies upon other tools. For example, a tool should not assume that its parent will be of a specific class, for the tool could not then be reused as a child of a different tool that provides similar functionality. A tool writer should carefully identify the minimum set of information required by the tool to function. For example, a "Quit" tool that simply exits the program requires no information, and can be a subtool of any tool. A "Copy" tool requires access to a list of currently selected items so that it can copy them. But, for different parent tools, the selected items may be three-dimensional objects in a scene, text elements in a list, or any of a number of other entities. If the copy tool has a uniform way of fetching this information from its parent, it can function as a child of any tool able to provide this information, including new tools not yet written. In fact, the Steam package itself can provide generic "Cut", "Copy", and "Paste" tools that can be plugged into any application that conforms to the rules of the package. This facilitates building new applications that include these widely useful functions.

The major purpose of placing tools in a tree is to provide access to resources. The property store 232 is the mechanism by which a tool both provides access to its own resources and acquires resources from other tools. Each tool in tree 300 has its own property store 232A–232G containing zero or more resources. Each resource is represented by a string name and a value. The tool owning a resource can specify a value for the resource; in addition, another tool having access to the resource can specify a value. Property stores are hierarchical and ordered, as by lines 320 illustrating the relationships for one branch of tool tree 300. This permits grouping resources together under a common name and fetching them as a group using wildcards. For example, to fetch all its preferences, a tool might execute a method getProperty("Preferences|*").

Requests for resources are issued to the requesting tool first. If a property is not found in the property store of the issuing tool, that tool looks in the property stores of its parents. As an example, tool 230G needs a particular piece of information to perform some function. It issues a getProperty(name) call to itself. If it does not find the resource (or all of the resource) in its own store 232G, the call propagates to the property store 232C of its parent tool 230A, and thence to 232B, until the property is found. This gathering mechanism allows any tool in the path, including the root, to provide resource information to a requester. Therefore, a tool can be plugged into any location in the tree in which its path to the root provides all the resource information needed for the tool to operate. The configuration file 234' copied by engine 210 at start-up contains some of the properties or resources stored in root tool 230A. Because tool 230A is the root of the tool tree, all these resources are available to all other tools in the tree. Again, a description 235 in each tool includes the names of the properties that it provides for other tools, and the names of the properties that it requires to operate correctly; configuration files 234 could take over this function to permit the system itself to determine automatically where in the tool tree a new tool can be placed.

Figure 4:
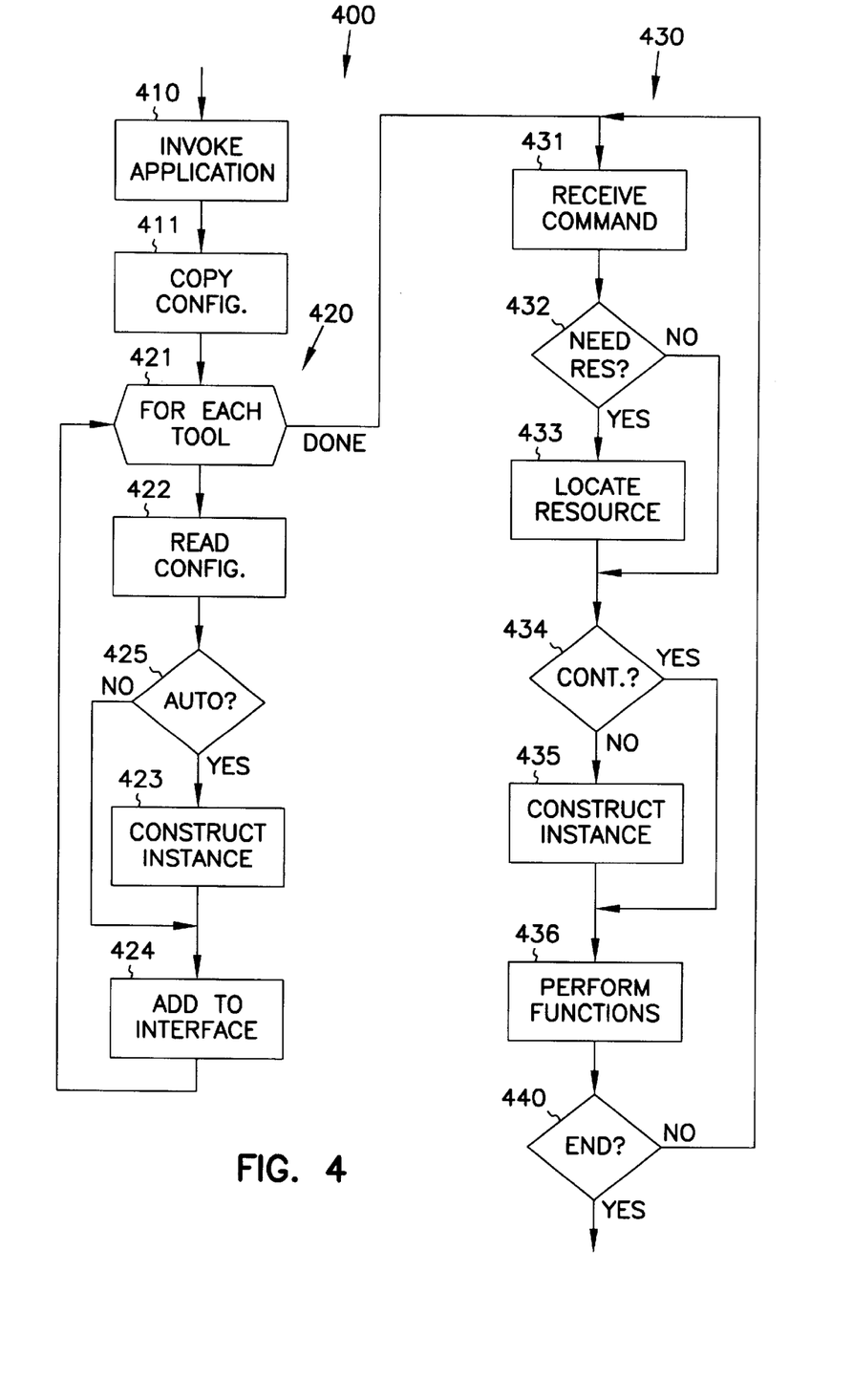
FIG. 4 describes a method for constructing and executing the application program of FIG. 3.

FIG. 4 is a flowchart 400 showing the construction and execution of an application according to the invention. A user invokes a component-based application at block 410 by selecting it in a menu of items, or in some other conventional way. Step 411 creates configuration file 234 in the property store 232 of root tool 230A by copying the externally stored file 234'. Thereafter, the external file is not referenced.

Steps 420 then proceed to build the application from its component tools. For each tool in the tree, block 421 causes block 422 to read the parameters of that tool from the configuration file stored in tool 230A. Block 423 constructs an instance of that tool, and block 424 adds that tool to the proper interfaces—buttons, toolbars, menus, and the like.

In a variation on this basic process, there are some cases where a tool should not be automatically constructed simply because it is named as a subtool. For example, an EditorApplicationDocument is a tool, and can have a menu interface, in the form of an entry in a menu of current documents. However, an instance of this tool is only created when the user opens a document. In these cases, the configuration must indicate that the tool should not be automatically created. This result can be achieved by adding subproperties to the tool entry. For example, a configuration file 234 could specify this with an AutoCreate false property as in the following fragment.

```
(ToolDef
    (dnx.1reditor.EditorApplicationDocument
        (Tools
            (MenuBar
                (Documents
                    (dnx.1reditor.EditorApplicationDocument
                        (AutoCreate false)
                    )
                )
            )
        )
    )
)
```

For such a tool, block 425 omits the actual construction of a tool instance. The same general mechanism could also define shortcut keys for invoking tools, indicate that interfaces should be created for parent or sibling tools without creating new instances, and indicate that tools are to be invoked automatically at creation time.

When all tools have been instantiated, blocks 430 execute the interactive application under the user's control. Block 431 receives an invocation of a function from a user interface, through an internal call, or by some other mechanism. If block 432 determines that the tool needs a resource, block 433 finds that resource by a hierarchical search of property stores as described above. If the instantiation of some tools has been held, block 434 causes block 435 to build those tools when necessary. Block 436 performs the function of the invoked tool through one of the tools own methods, or through a method it has inherited from another tool. Unless block 440 signals the end of the application, control returns to block 431 for another command. When the application terminates, its tool tree 300 goes away, to be rebuilt when the application is executed again. Thus, the configuration file can be modified after the application terminates, and the next invocation will effect the changes made since the previous execution, without any other effort.

In a possible variation, the construction of all tool instances could be left until that particular tool is actually called from a user interface or from another tool. That is, most or even all of the tools are not automatically created. Such incremental construction would reduce memory requirements for tool-based applications. Application functions that are rarely used do not take up space unless and until the user needs them. Some lesser-used tools might never be built during an execution.

Tool structures other than trees are possible. In particular, the use of directed acyclic graphs has been mentioned above.

Other variations of the invention within the scope of the present invention, as defined by the following claims, will appear to those skilled in the art.

Having described an embodiment thereof, we claim as our invention:

1. An application program for interacting with a user to perform multiple functions, the application comprising:
   a plurality of individual tools performing the functions of the application program, each tool including
      a set of methods for performing certain ones of the functions, and
      a set of stored resources associated with the individual tools and requestable by the methods of that tree and its children, some of the resources being displayable user interfaces; and
   a configuration file containing a representation of a tree structure specifying the relationships of the tools in the tree structure to each other.

2. A program according to claim 1, wherein one of the tools is a root tool located at the root of the tree.

3. A program according to claim 2, wherein the root tool contains the configuration file.

4. A program according to claim 1, further including a base class, and wherein all tools in the tree are subclasses of the base class such that the other tools inherit the methods of the base class.

5. A program according to claim 1, wherein any of the tools requests a resource first from its own set of resources and then hierarchically from the resources of its parents in the tree.

6. A program according to claim 1, wherein each of the tools further includes a description of the resources it provides to others of the tools.

7. A program according to claim 6, wherein the description includes resources required from others of the tools.

8. An application program for interacting with a user to perform multiple functions, the application program comprising:
   a plurality of individual tool means performing the functions of the application program, each tool means including
      a set of method means for performing certain ones of the functions, and
      a set of stored resource means associated with the individual tools and requestable by the method means of that tree and its children, some of the resource means being displayable user interfaces; and
   a configuration file associated with at least one of the tools and containing a representation of a tree structure specifying the relationships of the tools in the tree structure to each other.

9. A program according to claim 8, further including a base class means, and wherein all tool means in the tree are subclasses of the base class means.

10. A computer-readable storage medium containing executable instructions and data for an application program executable by a suitably programmed computer, the instructions and data comprising:
   a plurality of individual tools, each tool including
      a set of methods for performs individual functions of the application program, and
      a set of stored resources associated with the individual tools and requestable by the tool and by its parents in a tree, some of the resources being displayable user interfaces; and
   a configuration file containing a representation of a tree structure specifying the relationships of the tools in the tree structure to each other.

11. A storage medium according to claim 10, wherein one of the tools is a root tool located at the root of the tree, and wherein the root tool contains the configuration file when the application is being executed.

12. A method for constructing an application program from a plurality of component tools, comprising:
   reading into one of the tools a configuration file specifying a hierarchy of named tools and user interfaces;
   constructing instances of those of the tools named in the configuration file;
   connecting the tools in a hierarchical tree in accordance with the configuration file; and
   adding the tools to user interfaces specified in the configuration files.

13. A method for constructing an application program from a plurality of component tools, comprising:
   reading into one of the tools a configuration file specifying a hierarchy of named tools and user interfaces;
   constructing instances of those of the tools named in the configuration file wherein the configuration file contains a specification that an instance of one of the tools is not to be constructed, and delaying the construction of the one tool;
   connecting the tools in a hierarchical tree in accordance with the configuration file; and
   adding the tools to user interfaces specified in the configuration files.

14. A method for constructing an application program from a plurality of component tools, comprising:
   reading into one of the tools a configuration file specifying a hierarchy of named tools and user interfaces;
   constructing instances of those of the tools named in the configuration file; connecting the tools in a hierarchical tree in accordance with the configuration file;
   executing the application in accordance with the user interfaces; and
   terminating the execution of the application, the termination having the effect of destroying the hierarchical tree.

15. A configuration file for building an application program from a set of individual tools, the file comprising:
   names of a plurality of the tools and representations of their relationships as parents and children in a hierarchical order representing a tree structure;
   names of a plurality of interface elements associated with individual ones of the tools.

16. A configuration file according to claim 15, wherein the configuration file further specifies a layout of each tool's interface elements within the parent of that tool.

17. A configuration file according to claim 15, wherein each of the tools includes a set of resources available to others of the tools, and wherein the order of tools' names in the configuration file specifies which of the other tools the resources are available to.

18. A method according to claim 17, wherein the configuration file is a resource of one of the tools.

19. A method according to claim 15, wherein one of the tools is a root tool, and wherein the configuration file is included in the root tool.

20. A computer-readable medium containing a configuration file for building an application program executable by a suitably programmed digital computer from a set of individual tools, the file comprising:
   names of a plurality of the tools and representations of their relationships as parents and children in a hierarchical order representing a tree structure;

names of a plurality of interface elements associated with individual ones of the tools.

21. A computer-readable medium according to claim 20, wherein each of the tools includes a set of resources available to others of the tools, and wherein the order of tools' names in the configuration file specifies which of the other tools the resources are available to.

22. A method for executing an application program from a plurality of component tools, comprising:

reading into one of the tools a configuration file specifying a hierarchy of named tools and user interfaces;

constructing instances of those of the tools named in the configuration file wherein the configuration file contains a specification that an instance of one of the tools is not to be constructed, and delaying the construction of the one tool;

connecting the tools in a hierarchical tree in accordance with the configuration file; and adding the tools to user interfaces specified in the configuration files;

receiving a command to one of the tools from a user interface;

locating a resource required for the command; and performing a function specified by the command.

23. A method according to claim 22, wherein locating the required resource comprises requesting the resource from the one tool receiving the command.

24. A method according to claim 23, wherein locating the one resource further comprises:

determining that the one tool receiving the command does not contain the resource; and requesting the same required resource from a further tool in the tree.

25. A method according to claim 24, wherein the further tool is a parent of the one tool receiving the command.

* * * * *